United States Patent
Archer et al.

(10) Patent No.: US 8,667,501 B2
(45) Date of Patent: Mar. 4, 2014

(54) PERFORMING A LOCAL BARRIER OPERATION

(75) Inventors: Charles J. Archer, Rochester, MN (US); Michael A. Blocksome, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 13/206,590

(22) Filed: Aug. 10, 2011

(65) Prior Publication Data
US 2013/0042254 A1 Feb. 14, 2013

(51) Int. Cl.
*G06F 9/46* (2006.01)
(52) U.S. Cl.
USPC .......................................................... 718/106
(58) Field of Classification Search
None
See application file for complete search history.

(56) References Cited

U.S. PATENT DOCUMENTS

| | | | |
|---|---|---|---|
| 5,105,424 A | 4/1992 | Flaig et al. | |
| 5,333,279 A | 7/1994 | Dunning | |
| 5,513,371 A | 4/1996 | Cypher et al. | |
| 5,541,914 A | 7/1996 | Krishnamoorthy et al. | |
| 5,590,334 A | 12/1996 | Saulpaugh et al. | |
| 5,668,815 A | 9/1997 | Gittinger et al. | |
| 5,832,215 A | 11/1998 | Kato et al. | |
| 5,875,329 A | 2/1999 | Shan | |
| 5,878,241 A | 3/1999 | Wilkinson et al. | |
| 5,892,923 A | 4/1999 | Yasuda et al. | |
| 5,937,202 A | 8/1999 | Crosetto et al. | |
| 5,949,988 A | 9/1999 | Feisullin et al. | |
| 6,000,024 A | 12/1999 | Maddox et al. | |

(Continued)

FOREIGN PATENT DOCUMENTS

| | | |
|---|---|---|
| EP | 1835414 A2 | 9/2007 |
| JP | 2000156039 (A) | 6/2000 |
| JP | 2003317487 (A) | 11/2003 |
| WO | WO 2007/057281 A1 | 5/2007 |

OTHER PUBLICATIONS

Notice of Allowance, U.S. Appl. No. 12/124,763, mail date Oct. 3, 2012.

(Continued)

*Primary Examiner* — Gregory A Kessler
(74) *Attorney, Agent, or Firm* — Biggers Kennedy Lenart Spraggins LLP

(57) ABSTRACT

Performing a local barrier operation with parallel tasks executing on a compute node including, for each task: retrieving a present value of a counter; calculating, in dependence upon the present value of the counter and a total number of tasks performing the local barrier operation, a base value of the counter, the base value representing the counter's value prior to any task joining the local barrier; calculating, in dependence upon the base value and the total number of tasks performing the local barrier operation, a target value, the target value representing the counter's value when all tasks have joined the local barrier; joining the local barrier, including atomically incrementing the value of the counter; and repetitively, until the present value of the counter is no less than the target value of the counter: retrieving the present value of the counter and determining whether the present value equals the target value.

13 Claims, 8 Drawing Sheets

FIG. 6

(56) References Cited

U.S. PATENT DOCUMENTS

| | | |
|---|---|---|
| 6,038,651 A | 3/2000 | VanHuben et al. |
| 6,067,609 A | 5/2000 | Meeker et al. |
| 6,076,131 A | 6/2000 | Nugent |
| 6,108,692 A | 8/2000 | Van Seters et al. |
| 6,272,548 B1 | 8/2001 | Cotter et al. |
| 6,289,424 B1 | 9/2001 | Stevens |
| 6,473,849 B1 | 10/2002 | Keller et al. |
| 6,480,885 B1 | 11/2002 | Olivier |
| 6,691,101 B2 | 2/2004 | MacNicol et al. |
| 6,834,301 B1 | 12/2004 | Hanchett |
| 6,982,960 B2 | 1/2006 | Lee et al. |
| 7,143,392 B2 | 11/2006 | Ii et al. |
| 7,171,484 B1 | 1/2007 | Krause et al. |
| 7,203,743 B2 | 4/2007 | Shah-Heydari |
| 7,263,698 B2 | 8/2007 | Wildhagen et al. |
| 7,284,033 B2 | 10/2007 | Jhani |
| 7,352,739 B1 | 4/2008 | Rangarajan et al. |
| 7,363,474 B2 | 4/2008 | Rodgers et al. |
| 7,555,566 B2 | 6/2009 | Blumrich et al. |
| 7,571,439 B1 | 8/2009 | Rabinovici et al. |
| 7,590,983 B2 | 9/2009 | Neiman et al. |
| 7,613,134 B2 | 11/2009 | Rangaraajan et al. |
| 7,640,315 B1 | 12/2009 | Meyer et al. |
| 7,673,011 B2 | 3/2010 | Archer et al. |
| 7,697,443 B2 | 4/2010 | Archer et al. |
| 7,707,366 B2 | 4/2010 | Tagawa |
| 7,725,329 B2 | 5/2010 | Kil et al. |
| 7,739,451 B1 | 6/2010 | Wiedenman et al. |
| 7,774,448 B2 | 8/2010 | Shah-Heydari |
| 7,796,527 B2 | 9/2010 | Archer et al. |
| 7,808,930 B2 | 10/2010 | Boers et al. |
| 7,835,378 B2 | 11/2010 | Wijnands et al. |
| 7,936,681 B2 | 5/2011 | Gong et al. |
| 7,948,999 B2 | 5/2011 | Blocksome et al. |
| 7,974,221 B2 | 7/2011 | Tamassia et al. |
| 8,161,268 B2 | 4/2012 | Faraj |
| 8,161,480 B2 | 4/2012 | Archer et al. |
| 2002/0091819 A1 | 7/2002 | Melchione et al. |
| 2003/0041173 A1 | 2/2003 | Hoyle |
| 2003/0182376 A1 | 9/2003 | Smith |
| 2004/0034678 A1 | 2/2004 | Kuszmaul et al. |
| 2004/0073590 A1 | 4/2004 | Bhanot et al. |
| 2006/0156312 A1 | 7/2006 | Supalov |
| 2006/0182137 A1 | 8/2006 | Zhou et al. |
| 2007/0174558 A1 | 7/2007 | Jia et al. |
| 2007/0226686 A1 | 9/2007 | Beardslee et al. |
| 2008/0077366 A1 | 3/2008 | Neuse et al. |
| 2008/0109569 A1 | 5/2008 | Leonard et al. |
| 2008/0201603 A1 | 8/2008 | Ritz et al. |
| 2008/0250325 A1 | 10/2008 | Feigenbaum et al. |
| 2008/0273543 A1 | 11/2008 | Blocksome et al. |
| 2008/0288949 A1 | 11/2008 | Bohra et al. |
| 2008/0301683 A1 | 12/2008 | Archer et al. |
| 2009/0019218 A1 | 1/2009 | Sinclair et al. |
| 2009/0019258 A1 | 1/2009 | Shi |
| 2009/0037377 A1 | 2/2009 | Archer et al. |
| 2009/0037707 A1* | 2/2009 | Blocksome .................. 712/231 |
| 2009/0043910 A1 | 2/2009 | Barsness et al. |
| 2009/0064140 A1 | 3/2009 | Arimilli et al. |
| 2009/0067334 A1 | 3/2009 | Archer et al. |
| 2009/0240838 A1 | 9/2009 | Berg et al. |
| 2009/0248712 A1 | 10/2009 | Yuan |
| 2009/0259713 A1 | 10/2009 | Blumrich et al. |
| 2009/0292905 A1 | 11/2009 | Faraj |
| 2009/0310544 A1 | 12/2009 | Jain et al. |
| 2009/0319621 A1 | 12/2009 | Barsness et al. |
| 2010/0023631 A1 | 1/2010 | Archer et al. |
| 2010/0082788 A1 | 4/2010 | Mundy |
| 2010/0191911 A1 | 7/2010 | Heddes et al. |
| 2011/0010471 A1 | 1/2011 | Heidelberger et al. |
| 2011/0125974 A1 | 5/2011 | Anderson |
| 2011/0153908 A1 | 6/2011 | Schaefer et al. |
| 2011/0179134 A1 | 7/2011 | Mayo et al. |
| 2011/0258627 A1 | 10/2011 | Faraj et al. |
| 2011/0267197 A1 | 11/2011 | Archer et al. |
| 2012/0197882 A1 | 8/2012 | Jensen |

OTHER PUBLICATIONS

Final Office Action, U.S. Appl. No. 12/124,745, mail date Nov. 23, 2012.
Office Action, U.S. Appl. No. 12/748,594, mail date Sep. 14, 2012.
Office Action, U.S. Appl. No. 13/585,993, mail date Oct. 11, 2012.
U.S. Appl. No. 13/672,740, filed Nov. 9, 2012.
U.S. Appl. No. 13/666,221, filed Nov. 1, 2012.
Notice of Allowance, U.S. Appl. No. 12/124,745, mail date Mar. 6, 2013.
Final Office Action, U.S. Appl. No. 12/770,286, mail date Jan. 29, 2013.
Final Office Action, U.S. Appl. No. 12/748,594, mail date Mar. 22, 2013.
Notice of Allowance, U.S. Appl. No. 12/790,037, mail date Mar. 15, 2013.
Final Office Action, U.S. Appl. No. 13/459,832, mail date Jan. 4, 2013.
Notice of Allowance, U.S. Appl. No. 13/585,993, mail date Jan. 31, 2013.
Office Action, U.S. Appl. No. 13/672,740, mail date Apr. 2, 2013.
Notice of Allowance, U.S. Appl. No. 11/754,782, mail date Dec. 16, 2011.
Notice of Allowance, U.S. Appl. No. 11/754,740, mail date Nov. 8, 2011.
Notice of Allowance, U.S. Appl. No. 12/053,842, mail date Oct. 14, 2011.
Office Action, U.S. Appl. No. 12/060,492, mail date Jul. 16, 2012.
Notice of Allowance, U.S. Appl. No. 12/124,756, mail date Dec. 14, 2011.
Office Action, U.S. Appl. No. 12/124,745, mail date Jun. 15, 2012.
Office Action, U.S. Appl. No. 12/770,286, mail date Jul. 5, 2012.
Office Action, U.S. Appl. No. 12/760,020, mail date Feb. 13, 2012.
Notice of Allowance, U.S. Appl. No. 12/760,020, mail date Jul. 30, 2012.
Herbordt, M.C., Weems, C.C.; "Computing Parallel Prefix and Reduction Using Coterie Structures"; Frontiers of Massively Parallel Computation; 1992; Fourth Symposium; Oct. 19-21, 1992; pp. 141-149.
Fisher, et al.; "Computing the Hough Transform on a Scar Line Array Processor"; IEEE Transactions on Pattern Analysis and Machine Intelligence; vol. II, No. 3; Mar. 1989; pp. 262-265.
Office Action Dated Jul. 20, 2009 in U.S. Appl. No. 11/737,209.
Office Action Dated Sep. 4, 2009 in U.S. Appl. No. 11/843,090.
Faraj, A., et al. "Automatic Generation and Tuning of MPI Collective Communication Routines", ICS' 05, Jun. 20-22, Boston, MA, USA. pp. 393-402, ACM.
Shrimali, G., et al., "Building Packet Buffers Using Interleaved Memories", (Proc. Sixth Workshop High Performance Switching and Routing (HPSR '05), May 2005, pp. 1-5, IEEE.
Ong, H., et al., "Kernel-level Single System Image for Petascale Computing", SIGOPS Oper. Syst. Rev., Apr. 2006, pp. 50-54, vol. 40, No. 2, ACM, New York, NY, USA.
Foster, I., et al., "Message Passing and Threads," Sourcebook of Parallel Computing, (Month Unknown) 2003, pp. 301-317, Morgan Kaufmann Publishers Inc. URL: http://web.eecs.utk.edu/~dongarra/WEB-PAGES/SPRING-2006/chapter10.pdf.
Simonsson, P., "Implementation of a Distributed Shared Memory using MPI," Chalmers University of Technology and Goteborg University, 2004, Supervised together with Anders Gidenstam, Master's Thesis, Finished Jan. 11, 2005, pp. 1-98, Goteborg, Sweden.
Message Passing Interface Forum,"MPI: A Message-Passing Interface Standard Version 2.2", MPI Specification, Sep. 4, 2009, pp. 1-647, High Performance Computing Center Stuttgart (HLRS).
Vetter, J., et al., "Real-Time Performance Monitoring, Adaptive Control, and Interactive Steering of Computational Grids", International Journal of High Performance Computing Applications Winter 2000, pp. 357-366 (10 Pages), vol. 14, No. 4, Sage Publications, Inc. Thousand Oaks, CA, USA.

(56) References Cited

OTHER PUBLICATIONS

Wikipedia, "Cache (computing)—Wikipedia, the free encyclopedia", Cache (computing), Edited by EmausBot, Jul. 22, 2011, Accessed Aug. 10, 2013, 6 Pages.

Wikipedia, "Fuzzy logic—Wikipedia, the free encyclopedia", Fuzzy Logic, Edited by Jeff Silvers, Aug. 1, 2011, Accessed Aug. 10, 2013, 10 Pages.

Wikipedia, "Depth-first search—Wikipedia, the free encyclopedia", http://web.archive.org/web/20070505212029/http://en.wikipedia.org/wiki/Depth-first_search, Apr. 29, 2009, pp. 1-5.

Sistare, S., et al., "Optimization of MPI collectives on clusters of large-scale SMP's", Conference on High Performance Networking and Computing, Proceedings of the 1999 ACM/IEEE Conference on Supercomputing; Nov. 1999, pp. 1-14, ACM, New York, NY, USA.

Tanenbaum, A., "Structured Computer Organization", Jan. 1984, pp. 1-5, Second Edition, Prentice-Hall, Inc., Englewood Cliffs, NJ, USA, ISBN: 0-13-854489-1.

Shaw, D., et al., DADO: A Tree-Structured Machine Architecture for Production Systems, AAAI-82 Proceedings, Jan. 1982, AAAI (www.aaai.org), pp. 242-246, AAAI Press.

Better Explained, "Swap two variables using XOR I BetterExplained", http://betterexplained.com/articles/swap-two-variables-using-xor, Accessed Jun. 4, 2011, pp. 1-8.

Rosenberg, J., "Dictionary of Computers, Information Processing & Telecommunications", Sep. 1987, pp. 1-5, Second Edition, John Wiley & Sons, New York, NY, USA.

\* cited by examiner

PERFORMING A LOCAL BARRIER OPERATION

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for performing a local barrier operation with a plurality of parallel tasks executing on a compute node of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Although parallel processes often execute independent of one another, there are times in that synchronized execution amongst processes is required. To that end, parallel algorithms often employ a technique called a barrier. A barrier is a type of synchronization amongst a group of processes in which each process must stop executing upon reaching a particular point. Only when all processes reach the same point of execution and stop is the barrier operation complete and the processes may continue executing. Barrier operations are often carried out with many counters and as such are inefficient and utilize resources in an often resource-constrained system.

SUMMARY OF THE INVENTION

Methods, apparatus, and products for performing a local barrier operation with a plurality of parallel tasks executing on a compute node of a parallel computer are described in this specification and include for each task: retrieving a present value of a counter; calculating, in dependence upon the present value of the counter and a total number of tasks performing the local barrier operation, a base value of the counter, the base value representing the counter's value prior to any task joining the local barrier; calculating, in dependence upon the base value and the total number of tasks performing the local barrier operation, a target value of the counter, the target value representing the counter's value when all tasks have joined the local barrier; joining the local barrier, including atomically incrementing the value of the counter; and repetitively, until the present value of the counter is no less than the target value of the counter: retrieving the present value of the counter and determining whether the present value equals the target value.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
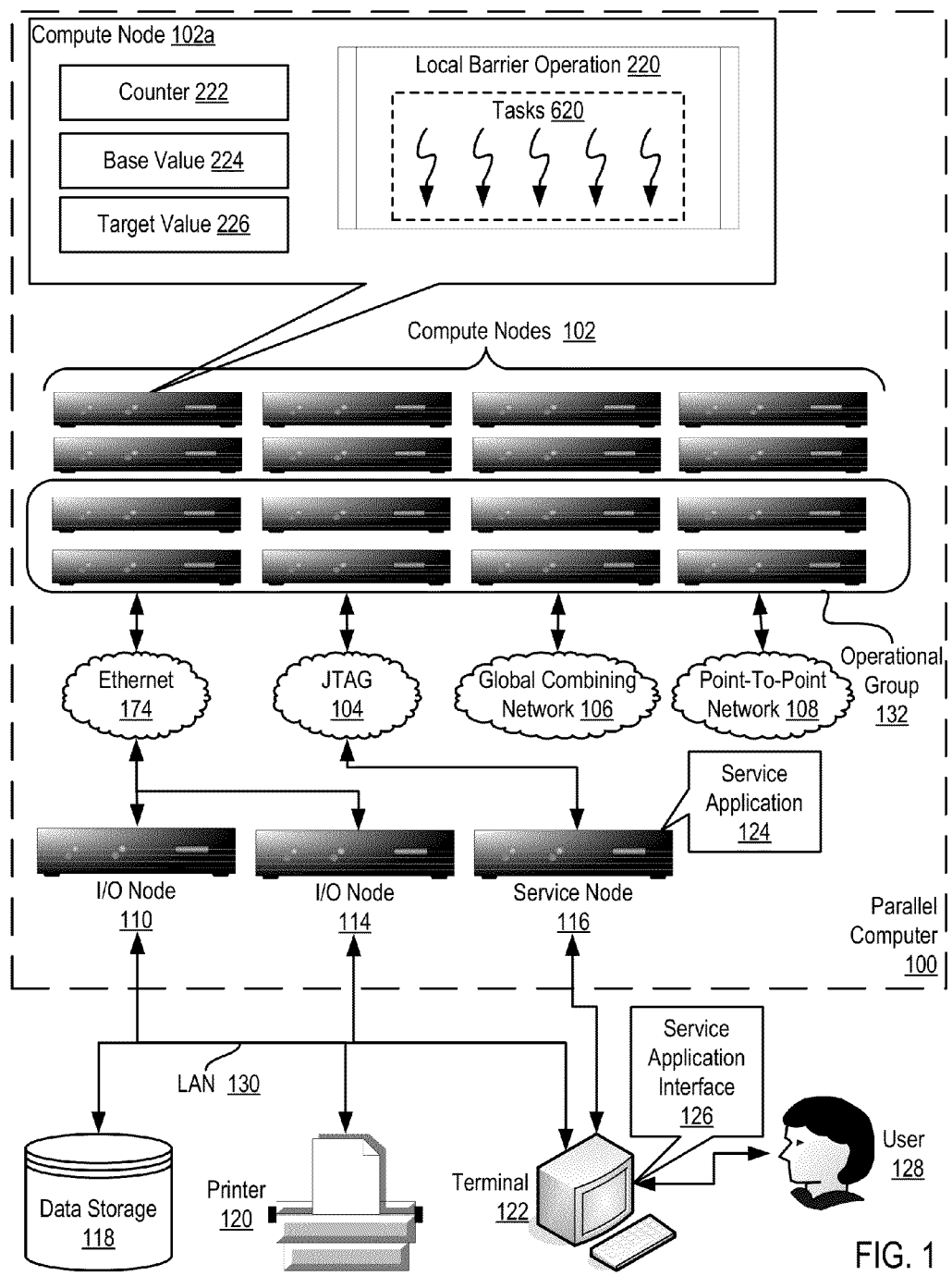
FIG. 1 illustrates an exemplary system for performing a local barrier operation with a plurality of parallel tasks executing on a compute node of a parallel computer according to embodiments of the present invention.

Exemplary methods, apparatus, and products for performing a local barrier operation with a plurality of parallel tasks executing on a compute node of a parallel computer in accordance with the present invention are described with reference to the accompanying drawings, beginning with FIG. 1. FIG. 1 illustrates an exemplary system for performing a local barrier operation with a plurality of parallel tasks executing on a compute node of a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for performing a local barrier operation with a plurality of parallel tasks (620) executing on a compute node (102a) of the parallel computer (100) in accordance with embodiments of the present invention. A barrier operation is descried as local, when the operation is for tasks on a single compute node. In contrast, a barrier operation described as 'global,' refers to a barrier operation carried out for multiple tasks on multiple compute nodes. A 'task' as the term is used in this specification represents an executing module of computer program instructions. Examples of tasks include parallel processes, threads, ranks in MPI, and so on as will occur to readers of skill in the art.

The parallel computer (100) of FIG. 1 operates generally for performing a local barrier operation by for each task (620): retrieving a present value of a counter (222); calculating, in dependence upon the present value of the counter and a total number of tasks performing the local barrier operation, a base value of the counter; calculating, in dependence upon the base value and the total number of tasks performing the local barrier operation, a target value of the counter; joining the local barrier, including atomically incrementing the value of the counter; and repetitively, until the present value of the counter is no less than the target value of the counter: retrieving the present value of the counter and determining whether the present value equals the target value.

An atomic operations—such as the atomic increment of the counter mentioned above—is an operation that appears to the rest of the system to occur instantaneously. Atomicity is a guarantee of isolation from other concurrent tasks or processes. Atomically incrementing the counter for example insures that while one task is a performing the increment—usually a load operation followed by an add operation—no other task modifies the value of the counter.

The base value (224) of the counter represents the counter's value prior to any task joining the local barrier. The counter in this example may be continuous from one barrier operation to the next. Consider, for example, the compute node (102a) of FIG. 1 in which five tasks (620) are executing. The counter (222) is initialized to zero prior to a first local barrier being performed. While performing the first local barrier operation, each of the five processes increments the counter. As such, when the first local barrier operation is complete, the value of the counter is five. After the second barrier operation, the value of the counter is ten. After the third, fifteen. And so on. In this way, the base value (224) of the counter representing the value of the counter prior to the present local barrier operation may be zero or some multiple of the total number of tasks (620). In the case of five tasks the base value (224) is either 0, 5, 10, 15, 20, and so on.

The target value (226) represents the counter's value when all tasks have joined the local barrier. The target value is the goal value of the counter that indicates all tasks have joined the barrier and execution may now proceed. Consider, for example, with a base value (222) of the counter initialized to zero and a total number of tasks (620) being five, the target value (226) for a local barrier operation is 5. With five tasks and a base value of 10, the target value (226) for a local barrier operation is 15. With five tasks and a base value of 100, the target value is 105. Once the target value is reached, each task has knowledge of the completion of the local barrier.

The arrangement of nodes, networks, and I/O devices making up the example apparatus illustrated in FIG. 1 are for explanation only, not for limitation of the present invention. Systems configured for performing a local barrier operation with a plurality of parallel tasks executing on a compute node of a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers configured for performing a local barrier operation with a plurality of parallel tasks executing on a compute node of a parallel computer according to embodiments of the present invention sometimes include thousands of compute nodes. In addition to Ethernet (174) and JTAG (104), networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing a local barrier operation with a plurality of parallel tasks executing on a compute node of a parallel computer according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of performing a local barrier operation with a plurality of parallel tasks executing on a compute node of a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (159), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
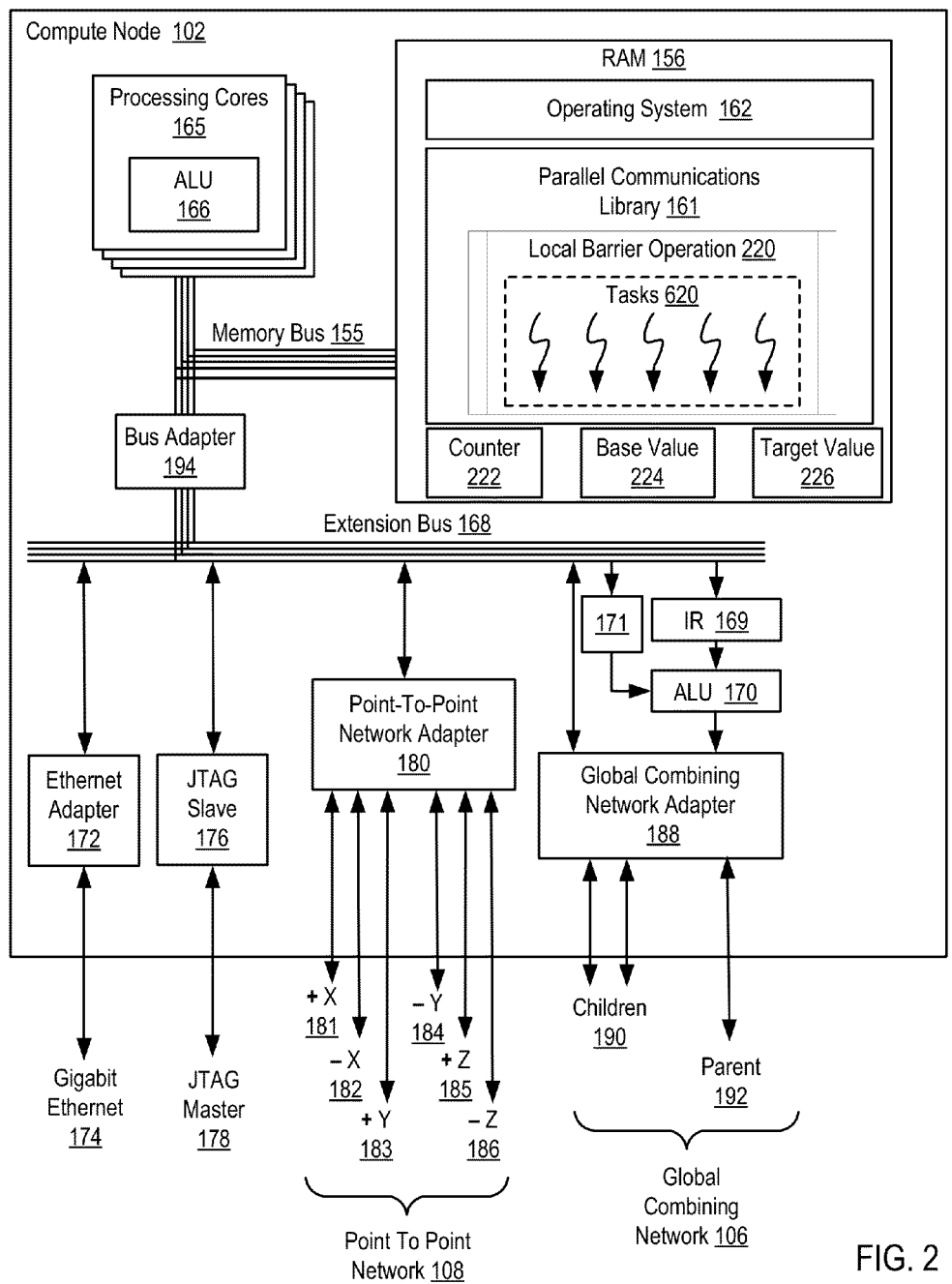
FIG. 2 sets forth a block diagram of an example compute node (102) useful in a parallel computer capable of performing a local barrier operation with a plurality of parallel tasks executing on a compute node of a parallel computer according to embodiments of the present invention.

The parallel communications library (161) in the example of FIG. 2 may also be configured to support performing a local barrier operation with a plurality of parallel tasks executing on a compute node of a parallel computer in accordance with embodiments of the present invention. To that end, each task (620) in the example of FIG. 2 may: retrieve a present value of a counter (222); calculate, in dependence upon the present value of the counter (222) and a total number of tasks (620) performing the local barrier operation, a base value (224) of the counter, where the base value represents the counter's value prior to any task (620) joining the local barrier. Each task (620) may also calculate, in dependence upon the base value (224) and the total number of tasks (620) performing the local barrier operation, a target value (226) of the counter that represents the counter's value when all tasks have joined the local barrier. After calculating the target value each task (620) may then join the local barrier, atomically increment the value of the counter (222), and repetitively, until the present value of the counter is no less than the target value of the counter: retrieve the present value of the counter and determining whether the present value equals the target value (226).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for performing a local barrier operation with a plurality of parallel tasks executing on a compute node of a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for performing a local barrier operation with a plurality of parallel tasks executing on a compute node of a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
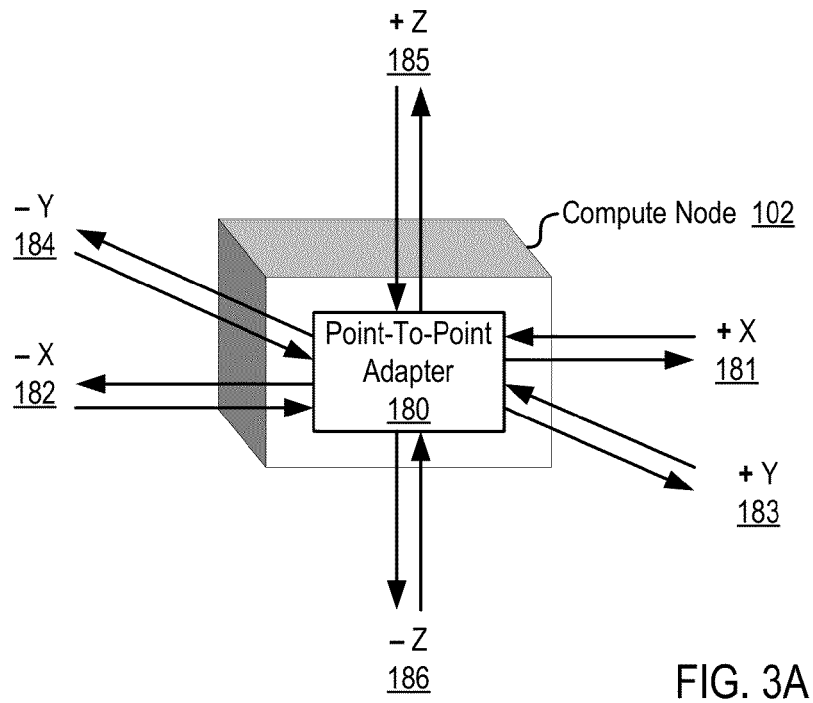
FIG. 3A sets forth a block diagram of an example Point-To-Point Adapter useful in systems for performing a local barrier operation with a plurality of parallel tasks executing on a compute node of a parallel computer according to embodiments of the present invention.

For further explanation, FIG. 3A sets forth a block diagram of an example Point-To-Point Adapter (180) useful in systems for performing a local barrier operation with a plurality of parallel tasks executing on a compute node of a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
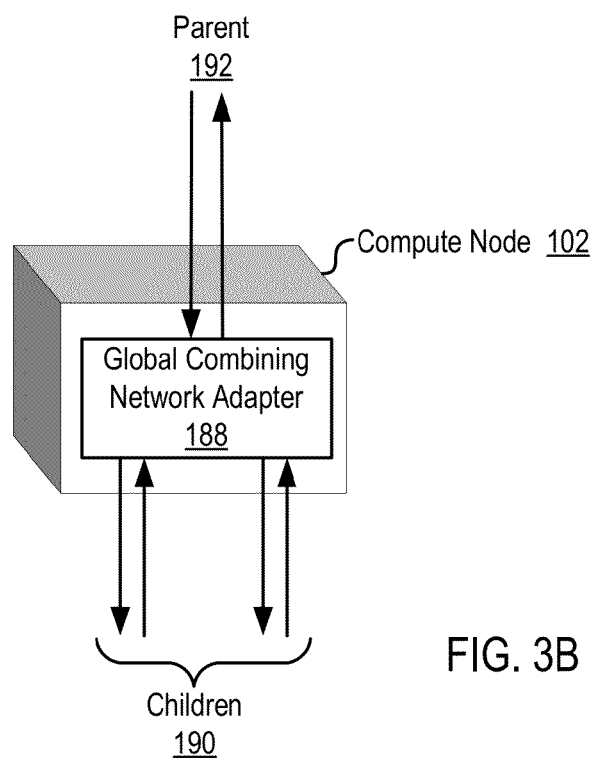
FIG. 3B sets forth a block diagram of an example Global Combining Network Adapter useful in systems for performing a local barrier operation with a plurality of parallel tasks executing on a compute node of a parallel computer according to embodiments of the present invention.

For further explanation, FIG. 3B sets forth a block diagram of an example Global Combining Network Adapter (188) useful in systems for performing a local barrier operation with a plurality of parallel tasks executing on a compute node of a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
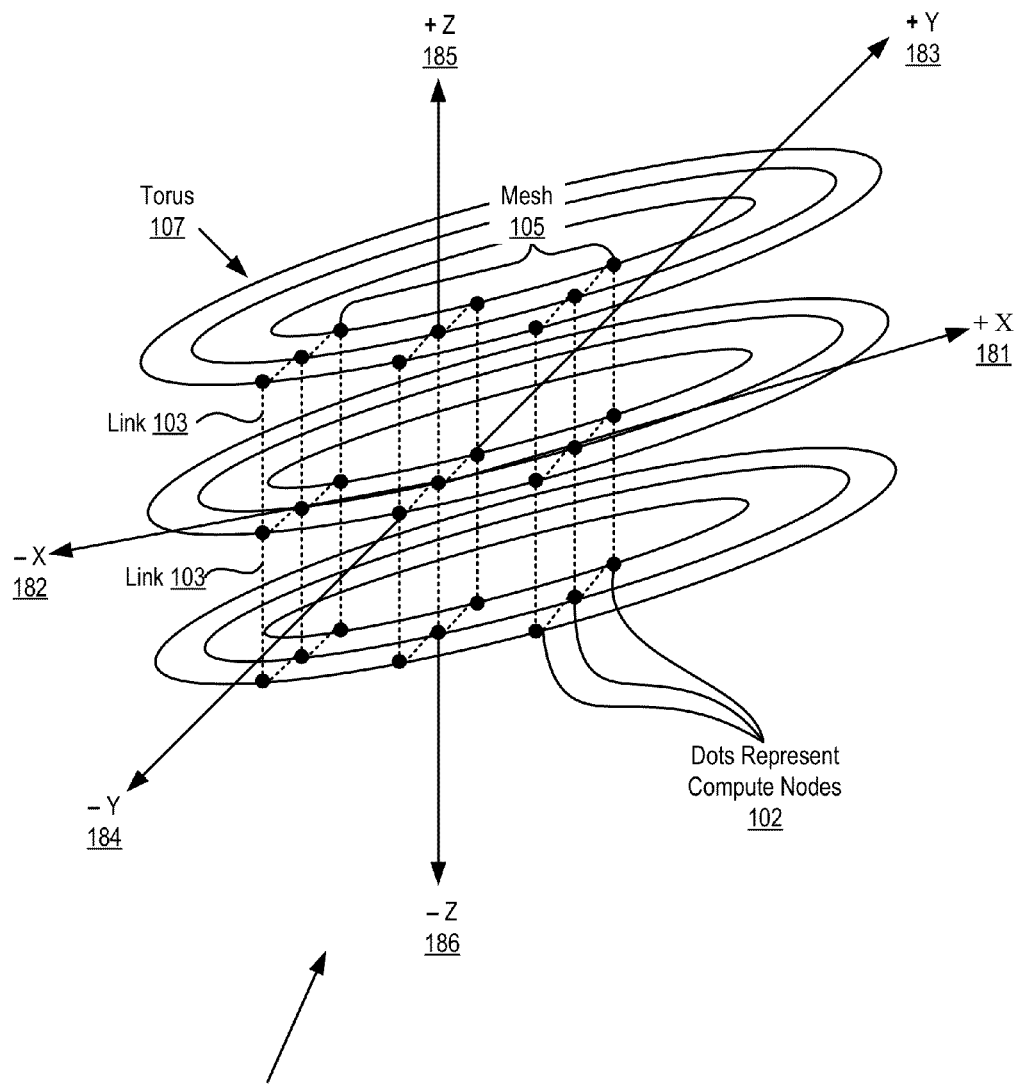
FIG. 4 sets forth a line drawing illustrating an example data communications network optimized for point-to-point operations useful in systems capable of performing a local barrier operation with a plurality of parallel tasks executing on a compute node of a parallel computer according to embodiments of the present invention.

For further explanation, FIG. 4 sets forth a line drawing illustrating an example data communications network (108) optimized for point-to-point operations useful in systems capable of performing a local barrier operation with a plurality of parallel tasks executing on a compute node of a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in performing a local barrier operation with a plurality of parallel tasks executing on a compute node of a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in performing a local barrier operation with a plurality of parallel tasks executing on a compute node of a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
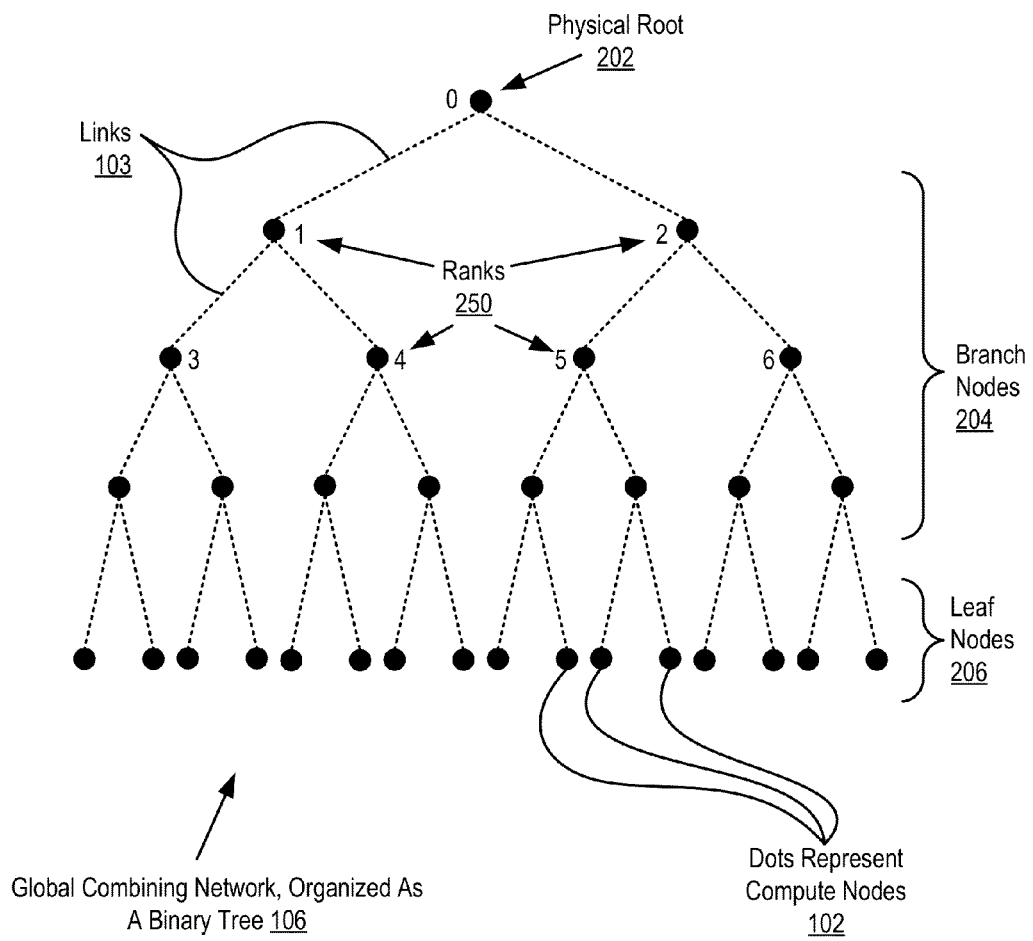
FIG. 5 sets forth a line drawing illustrating an example global combining network useful in systems capable of performing a local barrier operation with a plurality of parallel tasks executing on a compute node of a parallel computer according to embodiments of the present invention.

For further explanation, FIG. 5 sets forth a line drawing illustrating an example global combining network (106) useful in systems capable of performing a local barrier operation with a plurality of parallel tasks executing on a compute node of a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in performing a local barrier operation with a plurality of parallel tasks executing on a compute node of a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
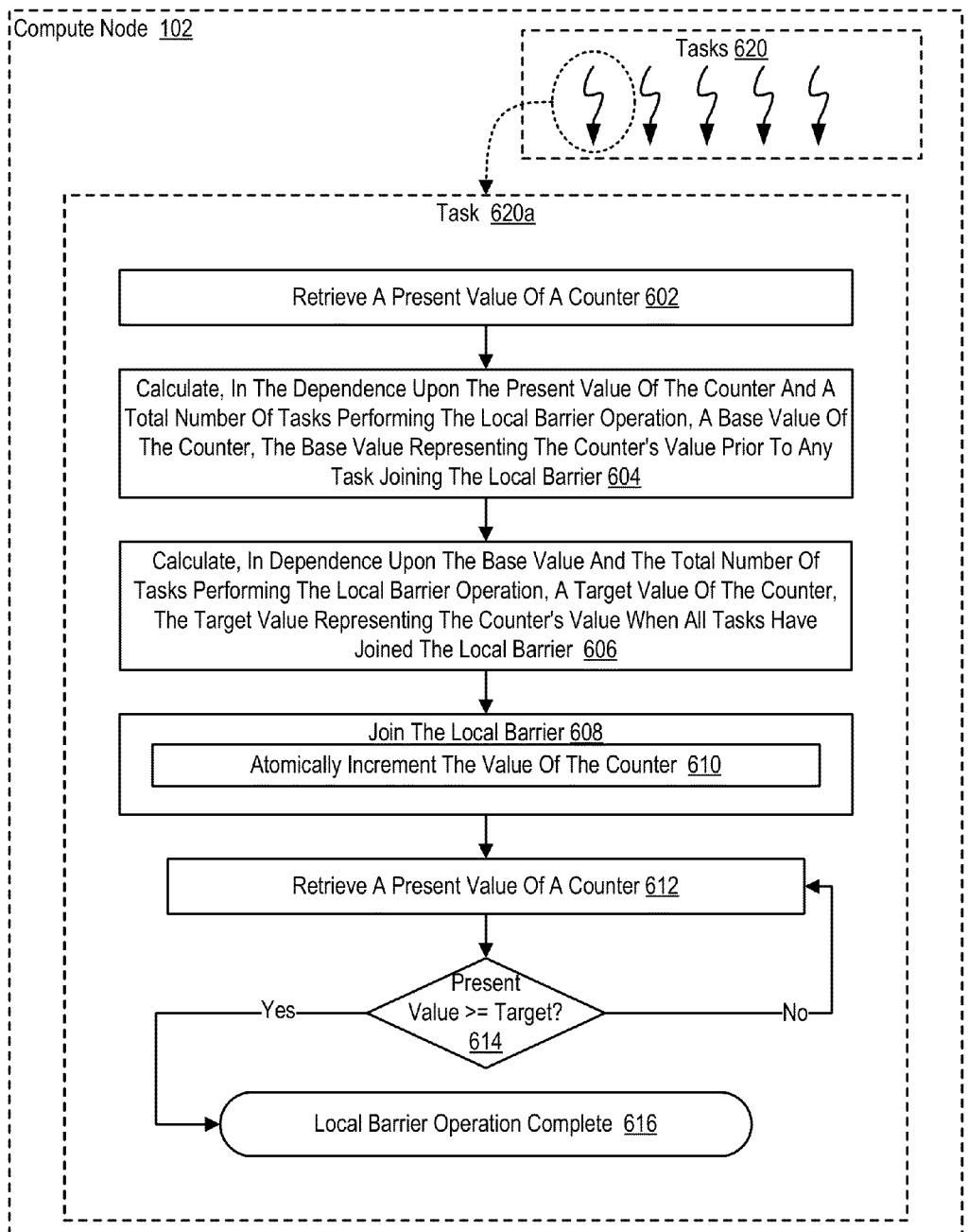
FIG. 6 sets forth a flow chart illustrating an example method for performing a local barrier operation with a plurality of parallel tasks executing on a compute node of a parallel computer according to embodiments of the present invention.

For further explanation, FIG. 6 sets forth a flow chart illustrating an example method for performing a local barrier operation with a plurality of parallel tasks executing on a compute node (102) of a parallel computer according to embodiments of the present invention. For clarity of explanation, the method of FIG. 6 illustrates one task (620a) carrying out the method, but readers of skill in the art will recognize that the method of FIG. 6 is carried out once by each task (620) on the compute node.

The method of FIG. 6 includes retrieving (602) a present value of a counter. Retrieving (602) a present value of a counter may be carried out in various ways. In some embodiments, for example, retrieving a present value of a counter may include performing an atomic 'get' operation using the counter's memory address. In this way, while one task is retrieving the value of the counter, no other task may modify the value.

The method of FIG. 6 also includes calculating (604), in dependence upon the present value of the counter and a total number of tasks performing the local barrier operation, a base value of the counter. In the example of FIG. 6, the base value of the counter represents the counter's value prior to any task joining the local barrier. That is, the base value represents the counter's value prior to any task incrementing the counter during the performance of the present local barrier operation.

The method of FIG. 6 also includes calculating (606), in dependence upon the base value and the total number of tasks performing the local barrier operation, a target value of the counter. In the method of FIG. 6, the target value represents the counter's value when all tasks have joined the local barrier.

The method of FIG. 6 also includes joining (608) the local barrier. In the method of FIG. 6, joining (608) the local barrier may include atomically incrementing the value of the counter. Atomically incrementing the value of the counter may be carried out in various ways including, for example, by performing an atomic fetch and add operation using the counter value's memory address.

Once the task (620a) has joined the local barrier, the method of FIG. 6 continues by retrieving (612) the present value of the counter and determining (614) whether the present value equals the target value. If the present value does not equal the target value, the method of FIG. 6 continues by again retrieving (612) the present value of the counter and determining (614) whether the present value equals the target value. Effectively, the task (620a) checks the counter value again and again until the value equals the target value. That is, the cycle continues, repetitively, until the present value of the counter is no less than the target value of the counter. Each instance of the retrieving (612) and determining (614) may be carried out at a predefined periodic interval. Once the present value of the counter is no less than the target value of the counter, the method of FIG. 6 terminates as the local barrier operations is complete (616).

Figure 7:
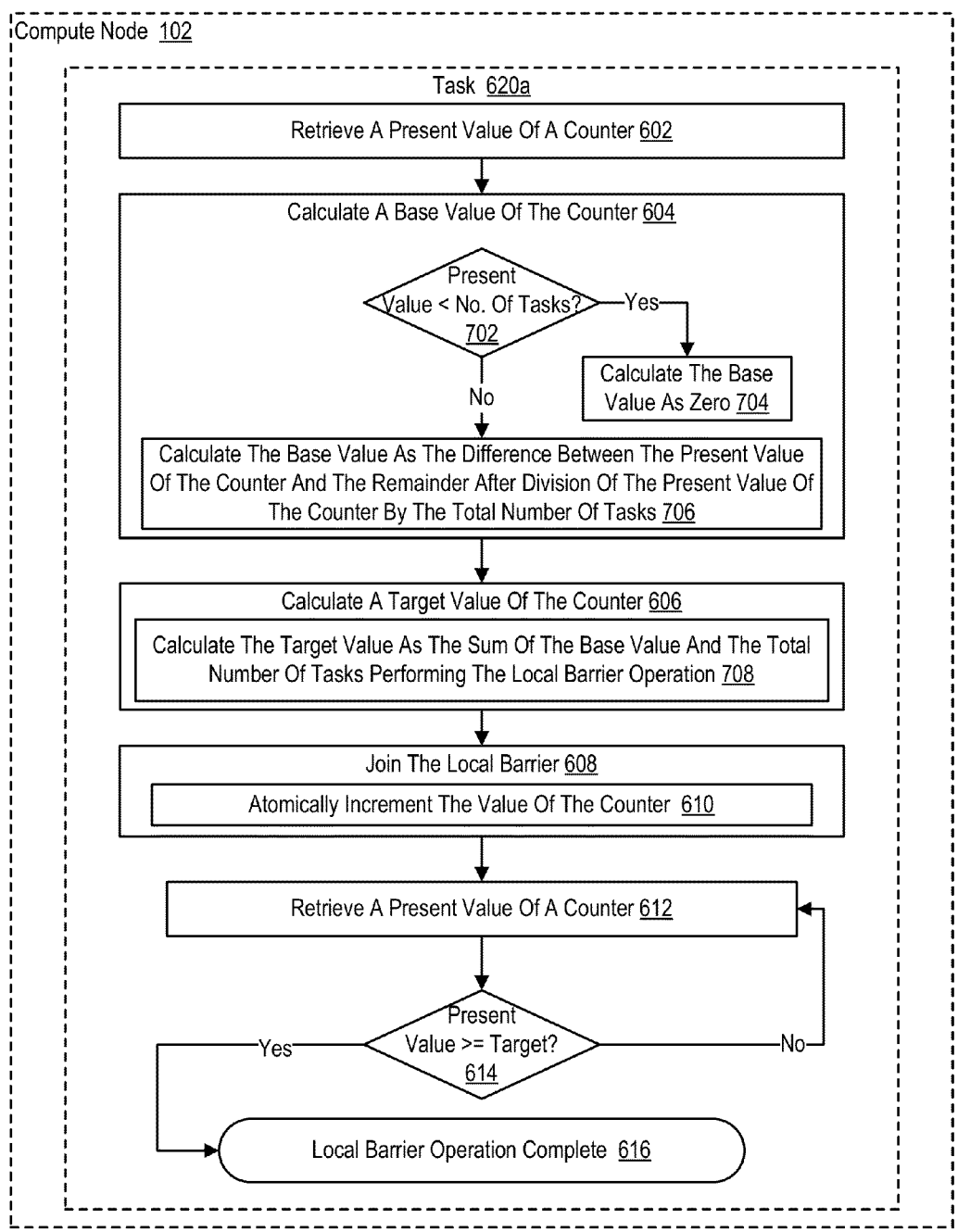
FIG. 7 sets forth a flow chart illustrating a further example method for performing a local barrier operation with a plurality of parallel tasks executing on a compute node of a parallel computer according to embodiments of the present invention.

For further explanation, FIG. 7 sets forth a flow chart illustrating a further example method for performing a local barrier operation with a plurality of parallel tasks executing on a compute node of a parallel computer according to embodiments of the present invention. The example method of FIG. 7 is similar to the method of FIG. 6 in that the method of FIG. 7 is carried out once by each task and includes retrieving (602) a present value of a counter, calculating (604) a base value of the counter, calculating (606) a target value of the counter, joining (608) the local barrier, atomically (610) incrementing the counter, and repetitively, until the present value of the counter is no less than the target value of the counter, retrieving (612) the present value of the counter and determining (614) whether the present value equals the target value.

In the method of FIG. 7, however, calculating (604) a base value of the counter is carried out by determining (702) whether the present value of the counter is less than the total number of tasks performing the local barrier operation. If the present value of the counter is less than the total number of tasks performing the local barrier operation, the method of FIG. 7 continues by calculating (704) the base value of the counter as zero.

If the present value of the counter is not less than the total number of tasks performing the local barrier operation, the method of FIG. 7 continues by calculating (706) the base value as the difference between the present value of the counter and the remainder after division of the present value of the counter by the total number of tasks performing the local barrier operation. Said another way, if the present value is not less than the total number of tasks, the task (620a) may calculate the base value of the counter as the difference between the present value and the result of a modulo operation with the present value and the total number of tasks. Consider, as another example, the following C-system pseudo-code:

```
void barrier_join( )
{
    present_value = atomic_get (counter);
    if (present_value < number_of_tasks) {
        base_value = 0;
    }
    else{
        base_value = present_value − ( present_value
        % number_of_tasks);
    }
}
```

The above example pseudo-code includes an atomic get of the present value of the counter—'present_value.' Next, the code determines whether the present value is less than the number of tasks. If the present value is less than the number of tasks the code sets the value of base_value equal to zero. If the present value is not less than the number of tasks, the base value is calculated as the present value minus the present value mod the number of tasks.

For further explanation, consider the values in the example Table 1 below:

TABLE 1

Example Base Values

| number_of_tasks | present_value | present_value_%<br>number_of_tasks | base_value |
|---|---|---|---|
| 10 | 9 | N/A | 0 |
| 10 | 11 | 1 | 10 |
| 5 | 23 | 3 | 20 |

Table 1 above includes several sets of example values for the number of tasks, the present value of the counter and the resultant base value. In the first example, 10 tasks are performing the local barrier operation and the present value of the counter is 9. Because the present value of the counter is less than the number of tasks, no mod operation is performed and the task performing the method sets the base value to 0. In the second example in Table 1, the number of tasks performing the local barrier operation is 10, the present value of the counter is 11, the present value mod number of tasks results in 1 and the base value (equal to the present value minus the result of the mod operation) is 10. In the third example in Table 1, the number of tasks performing the local barrier operation is 5, the present value of the counter is 23, the present value mod the number of tasks results in 3, and the base value is calculated as 20.

Also in the method of FIG. 7 calculating (606) a target value of the counter is carried out by calculating (708) the target value as the sum of the base value and the total number of tasks. Consider, for example, the following pseudo-code similar to the pseudo-code above but including code directed to calculating a target value:

```
void barrier_join( )
{
    present_value = atomic_get (counter);
    if (present_value < number_of_tasks) {
        base_value = 0;
    }
    else{
    base_value = present_value – ( present_value
    % number_of_tasks);
    }
    target_value = base_value + number_of_tasks;
    atomic_inc (counter);
}
```

Consider also Table 2 below, similar to Table 1 but including an additional column corresponding to target values of the counter:

TABLE 2

Example Target Values

| number_of_tasks | present_value | present_value_%<br>number_of_tasks | base_value | target_value |
|---|---|---|---|---|
| 10 | 9 | N/A | 0 | 10 |
| 10 | 11 | 1 | 10 | 20 |
| 5 | 23 | 3 | 20 | 25 |

Figure 8:
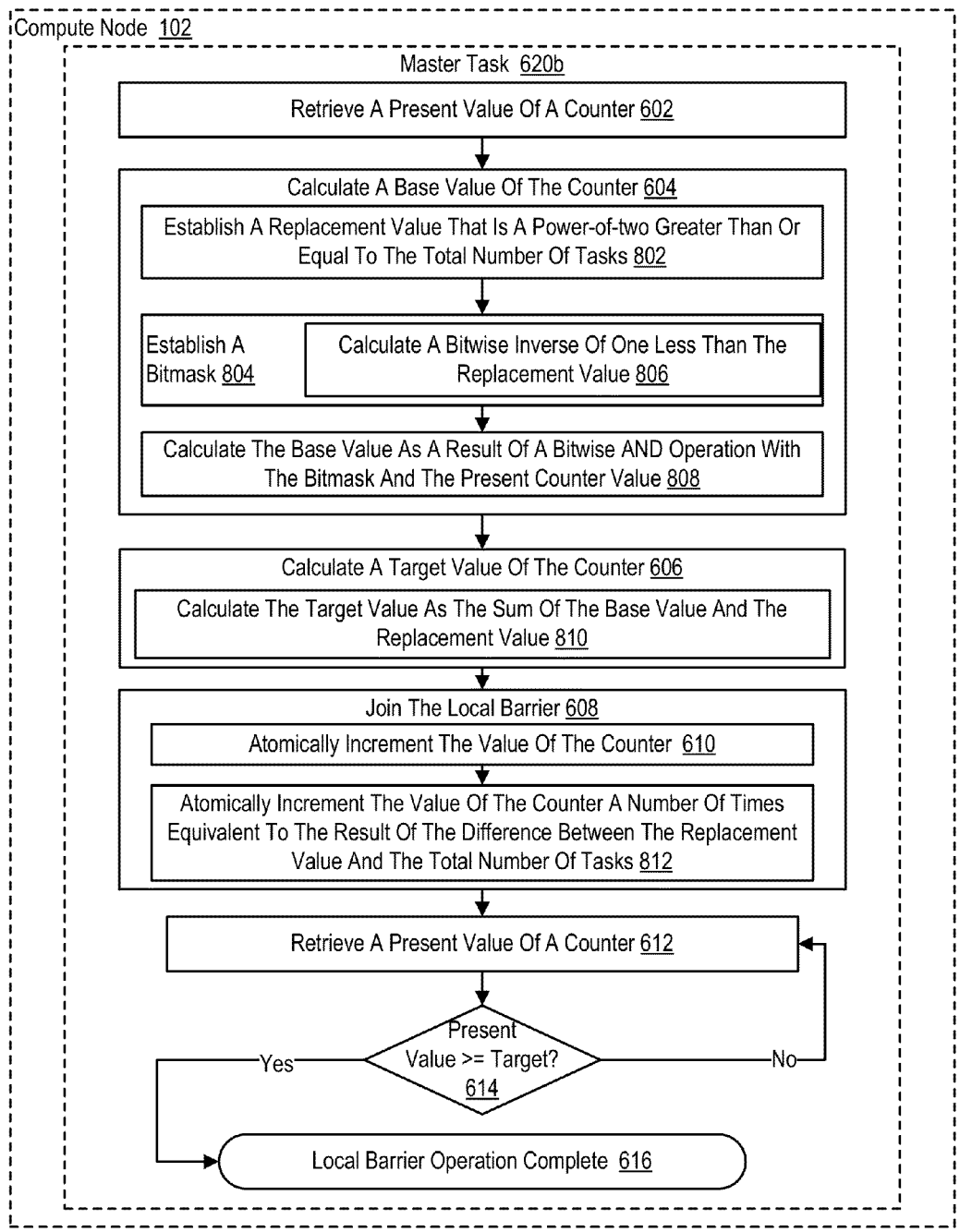
FIG. 8 sets forth a flow chart illustrating a further example method for performing a local barrier operation with a plurality of parallel tasks executing on a compute node of a parallel computer according to embodiments of the present invention.

For further explanation, FIG. 8 sets forth a flow chart illustrating a further example method for performing a local barrier operation with a plurality of parallel tasks executing on a compute node of a parallel computer according to embodiments of the present invention. The example method of FIG. 8 is similar to the method of FIG. 6 in that the method of FIG. 8 is carried out once by each task and includes retrieving (602) a present value of a counter, calculating (604) a base value of the counter, calculating (606) a target value of the counter, joining (608) the local barrier, atomically (610) incrementing the counter, and repetitively, until the present value of the counter is no less than the target value of the counter, retrieving (612) the present value of the counter and determining (614) whether the present value equals the target value.

In FIG. 8, however, one of the tasks is designated as a master task. A 'master' task may be given responsibilities slightly different than other non-master tasks. A master task may, for example, be implemented as a root rank in an MPI communicator or subcommunicator.

In the method of FIG. 8, calculating (604) a base value of the counter includes: establishing (802) a replacement value.

In the method of FIG. 6, the replacement value is a power-of-two greater than or equal to the total number of tasks performing the local barrier operation. Consider, for example that the total number of tasks performing the local barrier operation is 12. The next greatest power-of-two is 16 or $2^4$.

Calculating (604) a base value of the counter in the method of FIG. 8 also includes establishing (802) a bitmask. In the example of FIG. 8, establishing (804) a bitmask is carried out by calculating (806) a bitwise inverse of one less than the replacement value. Continuing with the above example of the replacement value being established as 16, the bitmask may be calculated as the bitwise inverse of 15 (one less than the replacement value). Assuming an 8-bit byte, the bitwise inverse of 15, in binary, is 11110000.

Calculating (604) a base value of the counter in the method of FIG. 8 also includes calculating the base value as a result of a bitwise AND operation with the bitmask and the present counter value. Continuing with the above example replacement value, bitmask, and assuming the present value of the counter is 17, a bitwise AND operation with 17 (00010001) and the bitmask (11110000) result in 00010001 (binary) or 16 (decimal).

In the example of FIG. 8, calculating (606) a target value of the counter is carried out by calculating (810) the target value as the sum of the base value and the replacement value. The replacement value, in many cases may not be the same as the total number of tasks performing the local barrier operation. Consider the example above in which the replacement value is 16 while the total number of tasks is 12. In this example, the target value is the base value (calculated above as 16) in addition to the replacement value or 32. With only 12 tasks incrementing the counter once, however, the target value will not be reached. Thus a mechanism for spoofing or faking the presence and actions of 4 additional tasks is needed.

To that end, joining (608) the local barrier in the method of FIG. 8 includes atomically incrementing, only by the master task, the value of the counter a number of times equivalent to the result of the difference between the replacement value and the total number of tasks. That is, the master task (620b) calculates the difference between the replacement value and total number of tasks—4 in the above example—then increments the counter 4 times. Readers of skill in the art will also notice that these increments of the counters value based on the difference between the replacement value and the total number of tasks are increments in addition to the master task's increment (610) of the counter. Continuing with the same example, the master task increments (610) the counter once upon joining the barrier, calculates the difference ('4') between the replacement value ('16') and the total number of tasks ('12') and increments (812) the counter value an additional number of times equivalent to the difference ('4'). In this example, the master task will increment the counter value 5 times: once for itself upon joining the counter and 4 more times to enable use of the power-of-two values.

Effectively, the result of the method of FIG. 8 is the same as that of FIG. 7—a mod operation. However, the method of FIG. 8 may employ various hardware and software techniques—the power-of-two values and bitmasks for example—that increase speed and efficiency of such a mod operation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for performing a local barrier operation with a plurality of parallel tasks executing on a compute node of a parallel computer, the apparatus comprising a computer processor, a computer memory operatively coupled to the computer processor, the computer memory having disposed within it computer program instructions that, when executed by the computer processor, cause the apparatus to carry out the steps of:

for each task:
retrieving a present value of a counter;
calculating, in dependence upon the present value of the counter and a total number of tasks performing the local barrier operation, a base value of the counter, the base value representing the counter's value prior to any task joining the local barrier;
calculating, in dependence upon the base value and the total number of tasks performing the local barrier operation, a target value of the counter, the target value representing the counter's value when all tasks have joined the local barrier;
joining the local barrier, including atomically incrementing the value of the counter; and
repetitively, until the present value of the counter is no less than the target value of the counter: retrieving the present value of the counter and determining whether the present value equals the target value.

2. The apparatus of claim 1 wherein:
calculating a base value of the counter further comprises: calculating the base value as zero if the present value of the counter is less than the total number of tasks performing the local barrier operation, and calculating the base value as the difference between the present value of the counter and the remainder after division of the present value of the counter by the total number of tasks performing the local barrier operation, if the present value of the counter is not less than the total number of tasks; and
calculating a target value of the counter further comprises calculating the target value as the sum of the base value and the total number of tasks performing the local barrier operation.

3. The apparatus of claim 1 wherein:
one of the plurality of tasks is designated as a master task;
calculating a base value of the counter further comprises:
establishing a replacement value, the replacement value comprising a power-of-two greater than or equal to the total number of tasks performing the local barrier operation;
establishing a bitmask, including calculating a bitwise inverse of one less than the replacement value; and
calculating the base value as a result of a bitwise AND operation with the bitmask and the present counter value;
calculating a target value of the counter further comprises calculating the target value as the sum of the base value and the replacement value; and
joining the local barrier, including atomically incrementing the value of the counter further comprises: atomically incrementing, only by the master task, the value of the counter a number of times equivalent to the result of the difference between the replacement value and the total number of tasks.

4. The apparatus of claim 1 wherein each task comprises a rank in a communicator, wherein one of the ranks is designates as a master rank.

5. The apparatus of claim 1 wherein the parallel computer comprises a plurality of compute nodes, the compute nodes coupled for data communications by a plurality of data communications networks.

6. The apparatus of claim 5 wherein the plurality of data communications networks comprises a mesh network and a torus network.

7. A computer program product for performing a local barrier operation with a plurality of parallel tasks executing on a compute node of a parallel computer, the computer program product disposed upon a computer-readable medium, wherein the computer-readable medium is not a signal, the computer program product comprising computer program instructions that, when executed, cause a computer to carry out the steps of:

for each task:
retrieving a present value of a counter;
calculating, in dependence upon the present value of the counter and a total number of tasks performing the local barrier operation, a base value of the counter, the base value representing the counter's value prior to any task joining the local barrier;
calculating, in dependence upon the base value and the total number of tasks performing the local barrier operation, a target value of the counter, the target value representing the counter's value when all tasks have joined the local barrier;
joining the local barrier, including atomically incrementing the value of the counter; and
repetitively, until the present value of the counter is no less than the target value of the counter: retrieving the present value of the counter and determining whether the present value equals the target value.

8. The computer program product of claim 7 wherein:
calculating a base value of the counter further comprises: calculating the base value as zero if the present value of the counter is less than the total number of tasks performing the local barrier operation, and calculating the base value as the difference between the present value of the counter and the remainder after division of the present value of the counter by the total number of tasks performing the local barrier operation, if the present value of the counter is not less than the total number of tasks; and
calculating a target value of the counter further comprises calculating the target value as the sum of the base value and the total number of tasks performing the local barrier operation.

9. The computer program product of claim 7 wherein:
one of the plurality of tasks is designated as a master task;
calculating a base value of the counter further comprises:
establishing a replacement value, the replacement value comprising a power-of-two greater than or equal to the total number of tasks performing the local barrier operation;
establishing a bitmask, including calculating a bitwise inverse of one less than the replacement value; and
calculating the base value as a result of a bitwise AND operation with the bitmask and the present counter value;
calculating a target value of the counter further comprises calculating the target value as the sum of the base value and the replacement value; and
joining the local barrier, including atomically incrementing the value of the counter further comprises: atomically incrementing, only by the master task, the value of the counter a number of times equivalent to the result of the difference between the replacement value and the total number of tasks.

10. The computer program product of claim 7 wherein each task comprises a rank in a communicator, wherein one of the ranks is designates as a master rank.

11. The computer program product of claim 7 wherein the parallel computer comprises a plurality of compute nodes, the compute nodes coupled for data communications by a plurality of data communications networks.

12. The computer program product of claim 11 wherein the plurality of data communications networks comprises a mesh network and a torus network.

13. The computer program product of claim 7 wherein the computer-readable medium comprises a computer-readable storage medium.

* * * * *